United States Patent [19]
Pilloff et al.

[11] 3,840,823
[45] Oct. 8, 1974

[54] SIMULTANEOUS TWO WAVELENGTH OPERATION IN INFRARED LASERS

[75] Inventors: Herschel S. Pilloff, Oxon Hill; Regina J. Cody, Forestville, both of Md.

[73] Assignee: The United States of America as represented by the Secretary of the Navy, Washington, D.C.

[22] Filed: Mar. 30, 1973

[21] Appl. No.: 346,540

[52] U.S. Cl............................................. 331/94.5 C
[51] Int. Cl................................................. H01s 3/08
[58] Field of Search..................................... 331/94.5

[56] References Cited
UNITED STATES PATENTS

| | | | |
|---|---|---|---|
| 3,471,799 | 10/1969 | Evtuhov | 331/94.5 |
| 3,482,184 | 12/1969 | Schneider et al. | 331/94.5 |
| 3,663,890 | 5/1972 | Schulthess et al. | 331/94.5 |
| 3,753,148 | 8/1973 | Billman | 331/94.5 |

*Primary Examiner*—William L. Sikes
*Attorney, Agent, or Firm*—R. S. Sciascia; Arthur L. Branning; Melvin L. Crane

[57] ABSTRACT

A laser system that provides simultaneous operation of any two laser transitions occuring in an infrared laser. A chemical active element in combination with a germanium flat that polarizes and spatially separates the two laser beams such that their polarizations are perpendicular to each other and directs the laser beams to separate gratings. Each grating is rotated to select and reflect a laser beam of a particular wavelength back through the system so that two particular beams are directed from the output.

1 Claim, 1 Drawing Figure

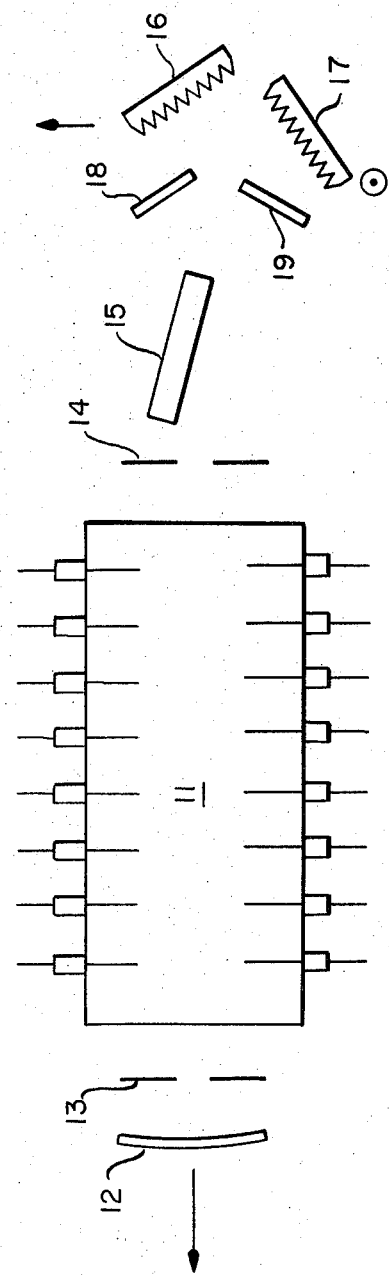

SIMULTANEOUS TWO WAVELENGTH OPERATION IN INFRARED LASERS

BACKGROUND OF THE INVENTION

This invention relates to lasers and more particularly to a system for simultaneous two wavelength operation in infrared lasers.

Heretofore, lasers have been operated for single wavelength outputs. Previously, it has been necessary to use two separate lasers to produce two beams having different wavelengths in the infrared. In using two lasers to produce a single beam, it is almost impossible to synchronize the two separate beams within less than a nanosecond. It is very difficult to bring the separate laser beams together with a high degree of spatial collimation. Further, it is difficult to insure that the two separately produced laser beams have precise orthogonal polarizations. Simultaneous, two-wavelength selection in the $N_2$ laser-pumped dye laser has been set forth in an article "Simultaneous Two Wavelength Selection in the $N_2$ Laser-pumped Dye Laser" by Herschel S. Pilloff in Applied Physics Letters, Vol. 21, No. 8, pps 339–340, Oct. 15, 1972.

SUMMARY OF THE INVENTION

This invention is directed to a technique for operating a tunable infrared laser simultaneously at two wavelengths. The two output beams are independently tunable, collinear, have mutually perpendicular polarizations and may be time synchronized. The system is provided with means for polarizing and separating the beams and separate gratings for selecting desired beams. An object of the invention is to provide simultaneous operation of any two laser transitions occuring in an infrared laser as well as to produce two laser beams with perfect spatial collimation and with precisely perpendicular polarizations.

BRIEF DESCRIPTION OF THE DRAWING

The FIGURE is a schematic diagram of the relative parts.

DESCRIPTION OF THE PREFERRED EMBODIMENT

Now referring to the drawing, there is shown in a schematic diagram a system for carrying out this invention. As shown, the system includes a chemical active element 11 operable to produce an infrared beam. The laser system is provided with a partially transmitting output mirror 12 spaced from one end of the active element and positioned on the optical axis thereof with an aperture 13 therebetween for selecting $TEM_{oo}$ modes. A second aperture 14 is opposite the other end which cooperates with the aperture 13 for selecting $TEM_{oo}$ modes. The active element beam produced by the laser passes through the aperture 14 onto a germanium flat 15 having a slight wedge to prevent etalon effects and with the surface upon which the laser light is incident oriented at Brewster's angle relative to the laser element. The germanium flat polarizes and spatially separates the laser beam into two separate beams such that the beam, λ1, with the polarization vector parallel to the plane of incidence represented, by the arrow,↕, in the drawing, is refracted to a rotatable grating 16. The beam, λ2, with the polarization vector perpendicular to the plane of incidence, represented by the, ⊙, in the drawing, is reflected to the grating 17. The two beams are time synchronized by inserting a variable loss element 18, 19 in the beam paths to gratings 16 and 17, as shown. Suitable variable loss elements are rotatable germanium or sapphire flats.

The active element shown represents a transverse electric discharge-initiated infrared hydrogen fluoride chemical TEA laser having a gas mixture of $SF_6$: hydrocarbon: He such as well known in the art. The active element shown is for illustrative purposes since the principles involved in this invention are applicable to other infrared lasers.

In operation, the active element is excited, as well known in the art, to produce vibrational-rotational transitions in the infrared. The gratings are set at a particular angle with respect to the optical axis. As such, each grating will reflect a beam of a particular wavelength back through the system. Thus, a pair of beams will be reflected back and forth between the partially transmitting mirror and the respective gratings. By independently rotating the two gratings, any two laser transitions with perpendicular polarizations can be selected from the manifold of the vibrational-rotational transitions of the HF active element. Because the $TEM_{oo}$ modes of the two wavelengths occupy essentially the same volume region in the laser cavity, the effect of stimulated emission on the population inversion between one set of vibrational-rotational (V-R) levels can be coupled through collisions to strongly effect the gain on a different V-R transition which is occuring simultaneously.

The germanium flat both polarizes and spatially separates the laser beam into two beams such that the beam with the polarization vector parallel to the plane of incidence is refracted to the grating 16 and the beam with the polarization vector perpendicular to the plane of incidence is reflected to the grating 17. Germanium has an index of refraction of approximately 4.0 at HF wavelengths, therefore, when oriented at Brewsters's angle reflects approximately 76 percent of the polarization component perpendicular to the plane of the incident beam. This is adequate for laser operation. Polarizing elements other than germanium such as silicon may be used and are required for operation at wavelengths longer than 20 microns.

One of the problems in the prior art has been time synchronization of the two output beams. In this invention, the two beams are time synchronized by the insertion of a variable loss element 18, 19 in the cavity arm of the higher gain transition. The variable loss is brought about by use of either germanium or sapphire flats which are rotated into the beam path, as desired.

Further, it has been determined that the characteristics of the laser output at one wavelength may be measured with or without oscillation at the second wavelength. In this way, the effects of uniquely perturbing various sets of V-R levels, one set at a time, on the gain of many different transitions in the laser plasma, may be undertaken.

The operation of the system produces the simultaneous operation of any two laser transitions occuring in an infrared laser. Two laser beams may be produced with perfect spatial collimation and with precisely perpendicular polarizations. The simultaneity and the perfect spatial collimation permits the two beams to be focused to the diffraction-limited spot sizes for producing extremely high power densities. The fact that the polarizations of the two beams are mutually perpendicular will facilitate index matching for non-linear optical studies. Other benefits of a two beam output will be obvious to one skilled in the art.

The laser system may use other halide gas mixtures to produce either atomic or molecular laser emission such as, CO mixtures, $CO_2$ mixtures etc. Also, different methods of excitation which are well known in the art may be employed.

Obviously many modifications and variations of the present invention are possible in the light of the above teachings. It is therefore to be understood that within the scope of the appended claims the invention may be practiced other than as specifically described.

What is claimed is:

1. A laser system with simultaneous, two different wavelength, single beam output operation; which comprises,
   a laser active media that produces a laser beam output,
   a partially transmitting mirror opposite one end of said laser active media in optical alignment therewith,
   a germanium flat, beam polarizer-beam separator positioned opposite the end of said laser active media opposite from said partially transmitting mirror in optical alignment therewith, with the surface thereof upon which the laser beam output is incident oriented at Brewster's angle relative to the optical axis of said laser active media for refracting a beam of one polarization and reflecting a beam having an opposite polarization,
   a first optical grating positioned opposite said beam polarizer-beam separator for selecting a desired beam refracted by said beam polarizer-beam separator, thereby forming a first cavity arm,
   a second optical grating positioned opposite said beam polarizer-beam separator for selecting a desired beam reflected by said beam polarizer-beam separator thereby forming a second cavity arm,
   first and second apertures positioned adjacent opposite ends of said laser active media in optical alignment therewith for selecting $TEM_{oo}$ modes, and
   first and second variable loss elements positioned between said optical gratings and said germanium flat, beam polarizer-beam separator,
   said variable loss elements are positioned into said first and second cavity arms whichever has a higher gain transition for time synchronization of said two output beams.

* * * * *